(12) United States Patent
Hotary et al.

(10) Patent No.: US 9,517,813 B2
(45) Date of Patent: Dec. 13, 2016

(54) HYBRID MONOHULL PLANING VESSELS

(71) Applicants: Mark George Hotary, Merritt Island, FL (US); Frederick Charles Herrington, Cocoa Beach, FL (US)

(72) Inventors: Mark George Hotary, Merritt Island, FL (US); Frederick Charles Herrington, Cocoa Beach, FL (US)

(73) Assignee: Brunswick Corporation

( * ) Notice: Subject to any disclaimer, the term of this patent is extended or adjusted under 35 U.S.C. 154(b) by 0 days.

(21) Appl. No.: 14/811,333

(22) Filed: Jul. 28, 2015

(65) Prior Publication Data

US 2015/0329179 A1    Nov. 19, 2015

Related U.S. Application Data

(63) Continuation-in-part of application No. 14/022,284, filed on Sep. 10, 2013, now Pat. No. 9,288,870.

(60) Provisional application No. 61/745,066, filed on Dec. 21, 2012.

(51) Int. Cl.
| | | |
|---|---|---|
| *B63B 1/00* | (2006.01) | |
| *B63B 1/20* | (2006.01) | |
| *B63B 1/04* | (2006.01) | |
| *B63B 1/18* | (2006.01) | |
| *G02F 1/1333* | (2006.01) | |

(52) U.S. Cl.
CPC ............. *B63B 1/20* (2013.01); *B63B 1/042* (2013.01); *B63B 2001/186* (2013.01); *B63B 2001/201* (2013.01); *B63B 2001/203* (2013.01); *G02F 1/13336* (2013.01)

(58) Field of Classification Search
CPC ............. B63B 1/00; B63B 1/02; B63B 1/04; B63B 1/042; B63B 1/10; B63B 1/16; B63B 1/20
USPC ................ 114/271, 283, 56.1, 61.33, 61.3
See application file for complete search history.

(56) References Cited

U.S. PATENT DOCUMENTS

| | | |
|---|---|---|
| 3,126,856 A | 7/1962 | Fuller |
| 3,625,173 A | 12/1971 | Mitton |
| 3,902,445 A | 9/1975 | Stolk |
| 4,004,542 A | 1/1977 | Holmes |
| 4,192,248 A * | 3/1980 | Moyer ............... B63B 1/20 114/288 |
| 4,492,176 A | 1/1985 | Arima |
| 5,063,868 A | 11/1991 | Fink, Jr. |
| 5,125,352 A | 6/1992 | Shields |
| 5,231,946 A | 8/1993 | Giles |
| D358,122 S | 5/1995 | Perette |
| 5,458,078 A | 10/1995 | Perette |
| 5,655,473 A | 8/1997 | Arvilla |
| 6,213,824 B1 | 4/2001 | Small |
| 6,546,890 B1 | 4/2003 | Craig |

(Continued)

*Primary Examiner* — Daniel V Venne
(74) *Attorney, Agent, or Firm* — Malin Haley DiMaggio & Bowen, P.A.

(57) ABSTRACT

A hull form design which incorporates bi-lateral semi-sponsons disposed on either side of a non-stepped V-shaped center hull section. The semi-sponsons extend the entire length of the hull form and comprise protrusions extending away from the center section. The semi-sponsons are delimited by longitudinal steps extending below the hull bottom an equal distance from the centerline on opposite sides of the hull. This design is a hybrid of conventional "V" hulls and catamarans and improves the roll and turn initiation time of convention monohull designs.

7 Claims, 4 Drawing Sheets

(56) References Cited

U.S. PATENT DOCUMENTS

| | | | |
|---|---|---|---|
| 6,629,507 B2 * | 10/2003 | Biddison | ........... B63B 1/042 114/271 |
| 7,055,451 B2 | 6/2006 | Kalil | |
| 2007/0266922 A1 | 11/2007 | Kalil | |
| 2009/0211510 A1 | 8/2009 | Kalil | |

* cited by examiner

| HULL MODELS | LENGTH OVERALL (FT) | BEAM OVERALL (FT) | VERTICAL CENTER OF GRAVITY (FT ABOVE KEEL) | RIGHTING MOMENT PER DEGREE (FT-LBS / DEGREE) |
|---|---|---|---|---|
| 160 ELEMENT | 16.2 | 7.4 | 2.0 | 226 |
| COMPARISON MODEL 1 | 16.2 | 7.2 | 1.8 | 98 |
| COMPARISON MODEL 2 | 15.3 | 7 | 1.8 | 105 |
| COMPARISONS MODEL 3 | 17.5 | 6.9 | 2.1 | 116 |

HYBRID MONOHULL PLANING VESSELS

CROSS REFERENCE TO RELATED APPLICATIONS

This application is a continuation-in-part of U.S. patent application Ser. No. 14/011,284, filed on Aug. 27, 2013, which claims the benefit of U.S. Provisional Application No. 61/745,066 filed on Dec. 21, 2012.

STATEMENT REGARDING FEDERALLY SPONSORED RESEARCH OR DEVELOPMENT

N/A

BACKGROUND OF THE INVENTION

1. Field of the Invention

The present invention generally relates to vessel hulls and more specifically to an improved hybrid hull form for mono-hull planing vessel having hybrid characteristics of both catamarans and conventional V-bottom hull forms.

2. Description of Related Art

V-shaped hull bottoms are well known in the marine industry, including semi-V and deep-V hull bottoms, with respect to both planing vessels and displacement vessels. Planing hulls, whether monohull catamaran or otherwise, are typically used in both off-plane and on-plane conditions. In off-plane conditions, the weight of the vessel is supported by the buoyant force created by the hull geometry. However, a planing hulls is also designed to develop significant lifting forces at higher speeds which allows it to skim across the water's surface with a portion of the forward hull above the surface, known as an "on-plane" condition. When planing hull vessels are "on plane," hydrodynamic lift, rather than displacement, supports the weight of the vessel. The particular dimensions, deadrise, strake and chine line features of the hulls vary tremendously depending on the type of vessel. These features can significantly affect ride quality, speed and maneuverability of the vessel, amongst other characteristics and functions. Such boats include without limitation recreational craft, cruisers, yachts, and speed boats.

In comparison to mono-hull vessels, conventional catamarans are twin-hulled sailing and powered boats that typically employ two discrete demi-hulls with high length-to-beam ratios which are separated from one another by a central platform, helm, occupant or cockpit area. Catamarans vary tremendously in size, sailing and/or power vessels, and are well known in the art. Catamarans are successful as recreational vessels due to their tremendous stability and speed; however, some maneuvering characteristics are uncomfortable and overall agility is not in line with monohull performance.

Several attempts have been made to combine the features of various known hull designs in order to optimize ride, handling, and running speed characteristics; however, none have successfully improved handling and stability characteristics of mono-hull designs, particularly during maneuvering, nor other benefits as set forth in the present invention.

For example, the U.S. Pat. No. 6,629,507 to Biddison is entitled CHINE SYSTEM FOR A BOAT HULL and discloses a chine design system for a boat wherein the chine member is coupled to the bottom of the hull at a "base edge" and protrudes vertically in a direction away from the boat hull. A curved member couples the extended edge of the first set of chines to the angled panel members of the boat hull. The purpose of this design is to reduce noise levels and low speed by covering otherwise hard chines with curved geometry. The result is reduced noise but not improved running dynamics.

U.S. Pat. No. 6,213,824 to Small is entitled METHOD FOR REDUCING VESSEL DRAFT, and illustrates a boat hull having a design meant to reduce vessel draft, and includes unique tunnels which are open bottomed in one section and extend longitudinally within the hull to form "chutes" for deeper hull sections located in the aft section of the vessel. A super-cavitating propeller is positioned in the aft section of the tunnel. The chute is defined in cross-section as a channel which opens downwardly and can be generally rectangular. The inlet of the chute becomes a lifting surface for the vessel. The invention claims that the vessel has improved shallow water operation without encountering the losses normally associated with shallow draft drive systems or water jets. While the centerline propeller tunnel may reduce draft and drag, the vessel maintains a standard v-shaped monohull and thus may have less than desirable handling characteristics.

U.S. Pat. No. 4,492,176 to Arima is entitled BOAT HULL and illustrates designs for a boat hull having a pair of stern strakes which project rearwardly from the transom of the boat for the intended purpose of improving planing efficiency. The strakes have inner surfaces which ostensibly reduce side slipping of the vessel, and the patent recites varying length-to-width ratios of optimum design. While some performance enhancements may be seen by this design, it is still a traditional v-hull bottom and will lack desired stability in certain conditions.

U.S. Pat. No. 5,191,853 to Adler describes a stepped hydroplane hull wherein the aft section has a positive trim angle and a forward portion has either a flat or positive trim angle wherein the angle of the forward portion is less than that of the aft portion. The hull also includes a region immediately aft of the step which is ventilated to atmosphere by air passages joining the step above the water line, in order to reduce drag at pre-planing speeds when the step is completely immersed in water. The air passages are not longitudinally placed and ventilation actually occurs through the hull. As with traditional stepped hull designs, the keel of the hull is stepped as well, decreasing handling stability at high speeds.

U.S. Pat. No. 7,055,451 to Kalil is entitled VESSEL HULL and describes a vessel having a pair of vents formed in the chine on either side of the rear section allowing air to be introduced to the bottom of the vessel. However, this patent is merely a vented pocket added to a traditional V-shaped hull form and does not include semi-sponson geometry that would otherwise improve static and dynamic ability the hull as described in the present invention.

Other examples of isolated hull features include U.S. Pat. No. 3,996,869 which has limited sponsons that are not incorporated into the entire length of the hull, and U.S. Pat. No. 4,192,248 which discloses limited, very narrow sponsons only in the forward sections of the hull. The sponsons in these inventions are not being used to generate lift so much as to create an aerated tunnel beneath the hull and accordingly very little stability benefits are introduced into the designs.

Japanese Patent No. JP6-227478 to Yamashita describes a hull design having a forward stepped section, a longitudinally oriented keel, a transverse hydrofoil, and catamaran-like side hulls. The hull results in a main center hull stabilized by smaller demihulls with a hydrofoil connecting the demihulls, with the hydrofoil generating planing lift.

There are also a number of flat bottomed models and join boats existing in the market which are typically "stiffer" (reduced roll motions when off plane). They typically have a rectangular hull form when viewed in plane. Although somewhat stable in off-plane conditions, these designs experience very jarring accelerations in adverse conditions when on plane and can only be used comfortably in very calm water. Additionally, these rectangular hulls suffer from difficulty maintaining a steady course due to the lack of directional stability offered by a V-shaped hull.

Consequently, there is a marked need for an improved hull design that enhances the overall performance and ride quality of V-bottomed planing hulls. Such vessels often experience significant rolling motions due to the movement of passenger weight when off plane. There is also a tendency to bank (roll towards the center of turning circle) in high speed turns. These two roll related motions tend to cause discomfort for boat occupants to which present invention is directed at minimizing or eliminating.

It is, therefore, to the effective resolution of the aforementioned problems and shortcomings of the prior art that the present invention is directed. However, in view of the hull designs in existence at the time of the present inventions, it was not obvious to those persons of ordinary skill in the pertinent art as to how the identified needs could be fulfilled in an advantageous manner, nor to design a hybrid hull having the structural and functional features set forth herein.

SUMMARY OF THE INVENTION

The present invention contemplates a hybrid hull form for monohull planing vessels providing optimal speed and handling characteristics. In various embodiments, the hull form comprises the combined features of both catamaran hulls and conventional V-hulls. The primary difference is the use of semi-sponsons in the entire hull bottom. This mimics some of the stabilizing effects of a planing catamaran (low roll angles in turns, etc) while maintaining the performance of a traditional v-bottom hull. Most mono-hull designs emphasizing stability would simply increase beam (width) or decrease deadrise (angle of the hull bottom above the horizontal). The present hybrid hull design provides a vessel with greater stability then conventional v-hulls at a reasonable beam, and without sacrificing bottom deadrise, which is critical to a soft ride.

In some embodiments, the present invention is a planing vessel hull form, comprising a V-shaped center section and two semi-sponsons wherein the semi-sponsons are disposed on either side of the center section and extend along the entire length of the hull form. The center section and the semi-sponsons each define a running surface thus providing the combined benefits of a V-shaped monohull and a catamaran design. In some embodiments, the center section includes a center deadrise angle and each of the semi-sponsons include a sponson deadrise angle. The center section and each of said semi-sponsons are delimited by a longitudinal step along the length of said hull form. In some embodiments, the semi-sponsons extend below the V-shaped center section.

Accordingly, it is an object of the present invention to provide a novel hull form design well-suited for monohull planing vessels.

It is another object of the present invention to provide a hybrid hull form design having improved structural and functional features incorporating components from both catamaran hulls and conventional V-bottom hulls.

It is another object of the present invention to provide a hybrid hull form that has the benefits of greatly improved ride, handling and maneuverability characteristics and both low and high speeds.

It is another object of the present invention to improve the roll characteristics of a monohull vessel by incorporating stabilizing catamaran features heretofore not recognized in the art.

In accordance with these and other objects which will become apparent hereinafter, the instant invention will now be described with particular reference to the accompanying drawings.

DETAILED DESCRIPTION

Figure 1:
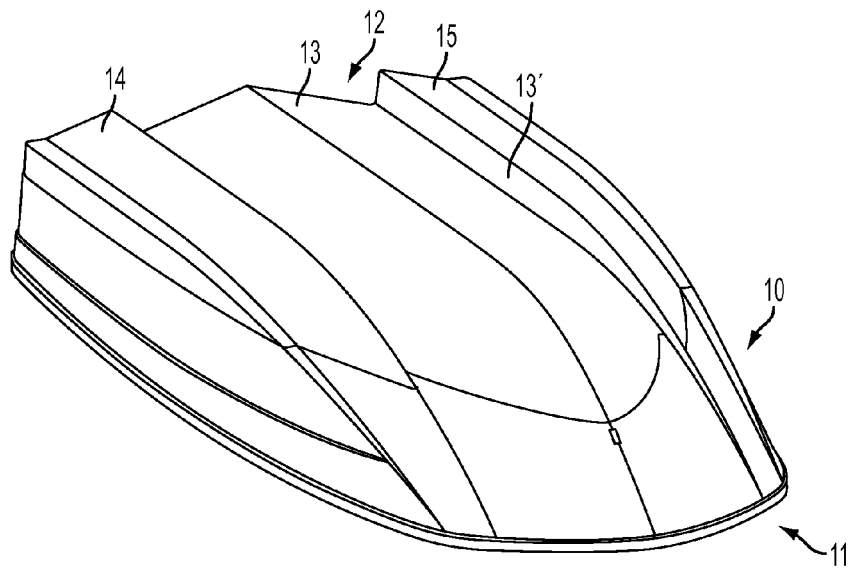
FIG. 1 is a perspective view of one embodiment of the hybrid hull form of the present invention.

With reference to FIG. 1, a perspective view of one embodiment of the hybrid hull form is shown. Hull form 10 generally comprises a bow section 11 and a stern section 12. The hull form 10 includes a generally V-shaped center section 13 and bi-lateral opposing semi-sponsons 14 and 15. As shown in FIG. 1, in some embodiments the V-shaped center section 13 comprises a traditional V-shaped hull configuration extending substantially the entire length of the hull form 10 from bow section 11 to stern section 12, substantially along the centerline thereof. The semi-sponsons 14 and 15 are disposed on either side of the center section 13 and extend the entire length of the hull form 10, substantially parallel with the V-shaped center section 13, to enhance the stability of the hull form 10. The semi-sponsons 14 and 15 are, in some embodiments, elongated projections extending away from the hull form 10 and center section 13 to expand the dimensions of the hull form 10 at or below the waterline. As such, the semi-sponsons provide buoyancy as well as hydrodynamic lift, depending on the velocity and operating conditions of the hull form 10. The semi-sponsons 14 and 15 are structurally distinct from chines and strakes known the art, which are known as sharp breaks on the hull surface and are not used for and do not provide buoyancy and lift as are the semi-sponsons 14 and 15 herein. The full-length semi-sponsons 14 and 15 provide a substantial advantage with respect to stabilizing the roll of a vessel fitted with hull form 10, while maintaining the performance benefits of the V-shaped center section 13. This is because, unlike a full catamaran vessel, the center section 13 of hull form 10 here maintains contact with the surface of the water, while the semi-sponsons provide lateral stability. Thus, the present invention uniquely combines the benefits of a V-shaped hull form with a catamaran hull form in a single, high-performance hull form 10.

The hull form 10 is non-stepped in that it does not include a transverse step laterally across all or a portion of the hull form 10. In the present invention, the use of a transverse step is disadvantageous in that it would significantly reduce the wetted surfaces of the center section 13, which dramatically changes the dynamic forces developed by the hull form 10. To be certain, if a step were to be included in the traditional location across the approximate center of the center section 13, the center section 13 would be dry and therefore would generate no lift. This would force the semi-sponsons 14 and 15 to develop most, if not all, of the lifting forces needed, effectively causing the vessel to run like a planing catamaran. Such planing catamarans known in the art have significant disadvantages in that they are prone to excessive outboard roll during maneuvering. This condition is intentionally avoided by the present invention because the non-stepped the center section 13 will remain wetted in order to develop lift in the same fashion as a conventional V-hull design. As such, the semi-sponsons 14 and 15 develop only enough lift to minimize the "banking" effect of such conventional V-hull designs, while not causing the vessel to roll outboardly as in a planing catamaran. Accordingly, the disadvantages of both a V-hull and a planing catamaran are entirely avoided by the present hull form 10.

Figure 2:
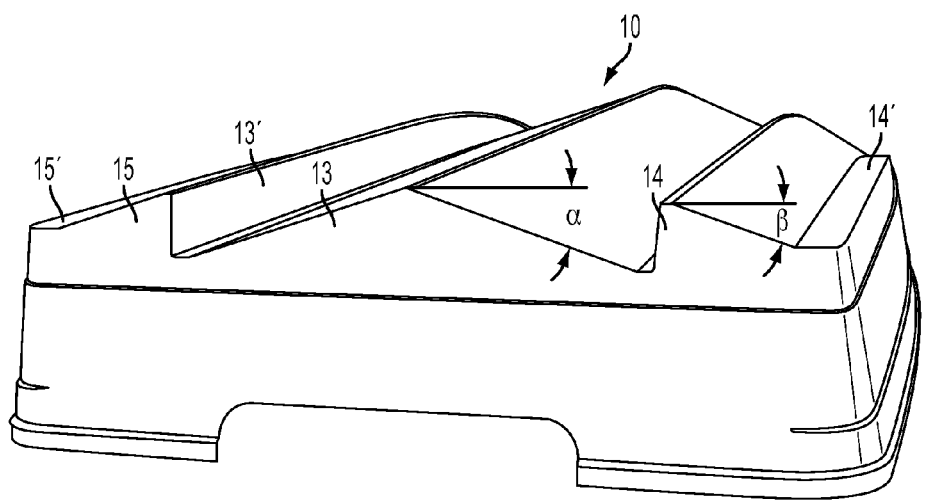
FIG. 2 is a rear perspective rear view of an embodiment of the hybrid hull form of the present invention.
Figure 3:
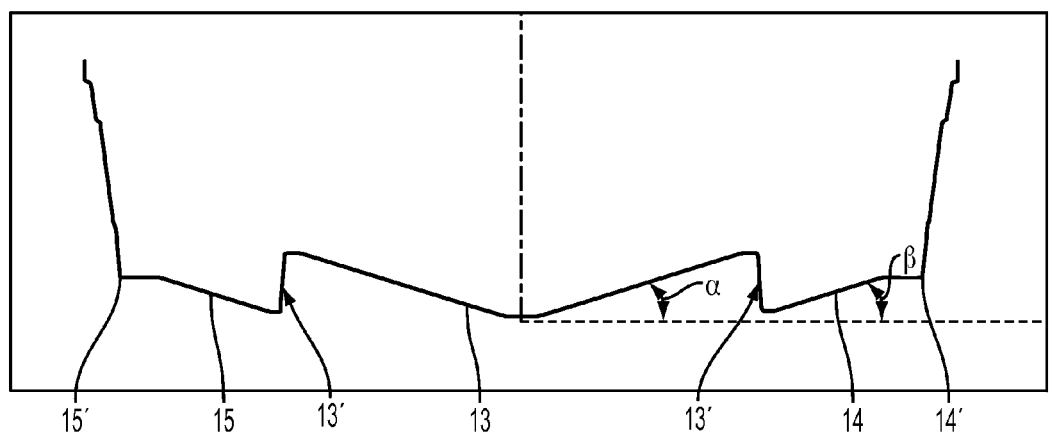
FIG. 3 is a cross-sectional schematic view of an afterbody section of one embodiment of the hybrid hull form of the present invention.

With reference to FIG. 2, a rear perspective view of the hull form 10, the center deadrise angle α of the v-shaped center section 13 can vary depending on the size and overall dimensions of the vessel and desired handling and performance characteristics. Similarly, the sponson deadrise angle β can vary to a maximum of 25 degrees depending on the size and overall dimensions of the vessel and desired handling and performance characteristics. If the deadrise angle were to exceed 25 degrees, the semi-sponson 14 and 15 would not be able to generate sufficient lift to provide the handling and stability advantages of the hull form 10. Thus, the semi-sponsons 14 and 15 function to provide lift, having the sponson deadrise angle β along with chines 14' and 15', respectively. With reference to FIG. 3, shown is a cross-sectional view of the hull form 10 of the present invention. Shown again is V-shaped center section 13 without traverse steps or other transverse discontinuities and bi-lateral semi-sponsons 14 and 15. Chines 14' and 15' are also depicted, delimiting the terminal side or edge of the planing semi-sponsons 14 and 15. The transition between the V-shaped center section 13 and the semi-sponsons 14 and 15 is delimited by the longitudinal steps 13' at the edge of either side of the center section 13. The longitudinal steps 13' are disposed longitudinally along the entire length of the hull form 10 as shown in FIGS. 1-3. The longitudinal steps 13' define the semi-sponsons 14 and 15 from the center section 13 and are distinguishable from conventional transverse steps found on stepped-hull designs. To that end, as noted above, the center section 13 of the hull form 10 is non-stepped, i.e. does not have a transverse step.

In some embodiments, the longitudinal steps 13' are disposed at a constant transverse distance from the center section 13 for its entire length running parallel to the longitudinal axis of the hull form 10. In some embodiments, the cross-section of the hull form is configured such that the width of each semi-sponson 14 and 15 is at least 10% of the entire width, i.e. beam, of the hull form 10. More particularly, in some embodiments, the width of each semi-sponson 14 and 15 shall be maintained at its maximum for at least 70% of its length from stern to bow. In this embodiment, the width of each semi-sponson 14 and 15 may taper slightly toward the bow, but along no more than 30% of its entire length. In some embodiments, in order to effectively develop the volume necessary to provide improved static and low speed stability, the longitudinal steps 13' have a height that is at least 5% of the overall width, i.e. beam, of the hull form 10.

Figures 4, 5:
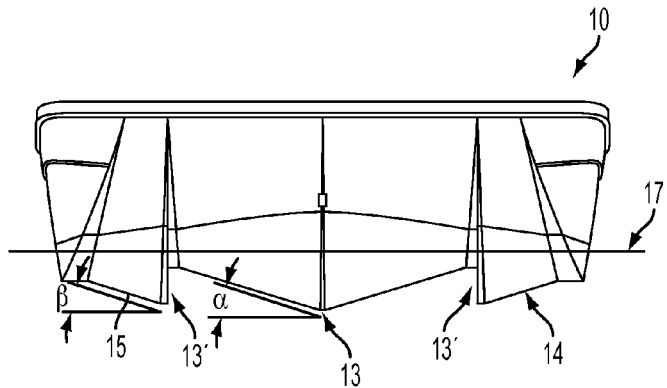
FIG. 4 is a detailed cross-sectional schematic view of one embodiment of the hybrid hull form of the present invention shown with respect to a water line.
FIG. 5 is a chart comparing the righting moment of the hull form of the present invention to other typical monohull hull forms.

FIG. 4 shows another cross-section view of the hull form 10 of the present invention, in more detail. Here, the hull form 10 is shown with respect to static waterline 17. In some embodiments, the semi-sponsons 14 and 15 extend downward to an elevation below the lowest point of the center section 13. As mentioned, the hull form 10 of the present invention is configured such t center section 13 and semi-sponsons 14 and 15 define running surfaces that remain in contact with the water throughout the vessel's operating range. This allows the vessel to retain the handling characteristics of a conventional monohull design while gaining the dynamic and static stability associated with catamarans designs.

Specifically, the hull form of the present invention improves performance and stability by working to reduce vessel roll during both on and off-plane motion. Unlike a conventional monohull or catamaran, the hull form 10 of the present invention provides three distinct areas of running surface, the center section 13 and semi-sponsons 14 and 15, separated by the longitudinal steps 13'. When the vessel using the hull form 10 of the present invention is off-plane, due to the bi-lateral semi-sponsons 14 and 15 the distribution of displacement of the hull form 10 is focused farther outboard as compared to a tradition V-hull design. This increases the righting moment/degree of the hull form 10 giving the vessel a more stable feel at low speeds. When on-plane, the bi-lateral semi-sponsons 14 and 15 of the hull form 10 of the present invention allow the vessel to turn with reduced roll angle (i.e. inward tilting or angling of vessel toward center of curvature) as compared to similar size standard V-hull vessels. In this sense, however, the vessel will operate most like a monohull design when turning and will not list outward from the center of curvature as most catamarans normally would.

Empirical evidence demonstrates that the righting moment of the hull form 10 of the present invention is much higher than standard hull form designs. The righting moment is a direct measurement of a vessel's tendency to resist roll motion in a displacement, i.e. "off-plane," operating condition. A higher righting moment indicates greater resistance to rolling and therefore greatly stability and comfort. FIG. 5 provides a comparison of the present invention indicated as "160 Element" to three other monohull designs. In some configurations, the present invention has more than twice the righting moment of comparably-sized monohull designs.

Figure 6A:
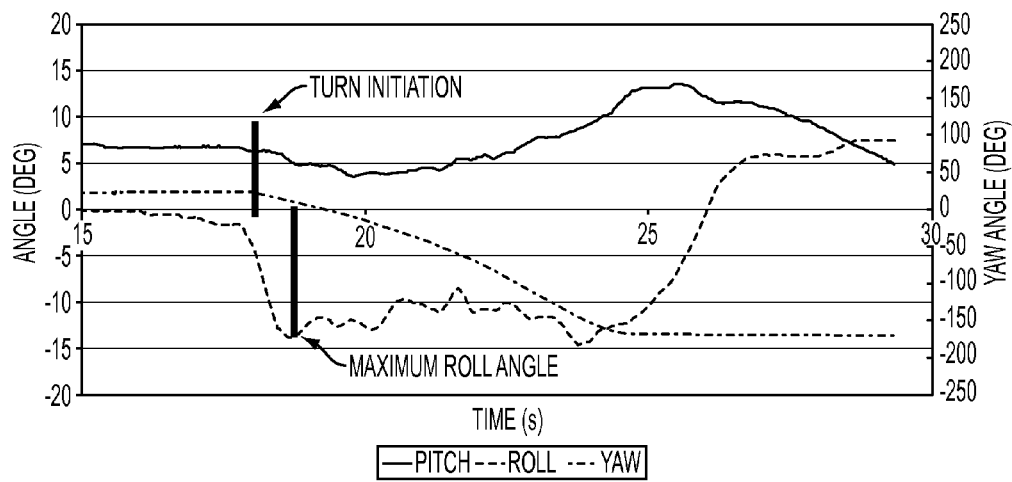
FIG. 6A is a graph depicting the roll angle and turn initiation time for a typical monohull design.
Figure 6B:
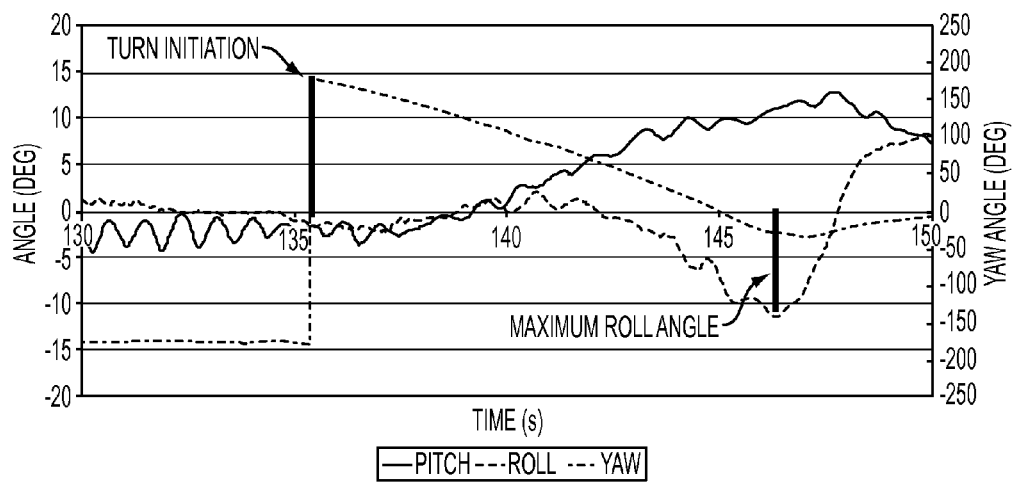
FIG. 6B is a graph depicting the roll angle and turn initiation time for the hull form of the present invention, showing significant improvement over that shown in FIG. 6A.

When operating on-plane, the lift generated by the semi-sponsons 14 and 15 reduces the maximum roll angle experienced during maneuvers, compared to similar sized V-hulls. Not only is the roll angle caused by high speed turns reduced, but the onset of that roll motion is delayed. FIGS. 6A and 6B show a comparison of the present hull form 10 to a similarly sized standard monohull during an on-plane, high speed port turn. The reduced maximum roll angle and longer transition of the hull form 10 reduce the forces exerted on the user during maneuvers. Testing shows that the present hull form 10 (Identified as "Bayliner 160 Element" in FIG. 6B) reduces the maximum roll angle during turns by at least 33% compared to a convention monohull vessel of similar dimensions and powering (identified as "Bayliner 160 OB" in FIG. 6A). In addition, time between the onset of a turn and reaching the maximum roll angle is increased from approximately 1 second to 12 seconds. This creates a very stable, calm, and predictable user experience, without sudden roll motions even during abrupt maneuvers. Accordingly, the advantages of the hull form 10 of the present invention compared to traditional monohull designs is apparent and substantial.

It is appreciated that the relative size and shape of a vessel built in accordance with the hull form 10 of the present invention may vary depending on overall design characteristics without departing from the spirit and scope of the present invention. Further, a hull form 10 in accordance with the present invention may comprise a variety of materials and may be configured as an in-board, out-board, or inboard/outboard vessel without requiring a departure from the spirit and scope herein. Materials selected are also a matter of a design although the present invention is particularly suited to standard fiberglass hull manufacturing well-known in the art.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A vessel hull form, comprising:
a non-stepped V-shaped center section extending along the entire length of said hull form;
two semi-sponsons comprising projections extending away from said center-section and disposed along the length of said hull form on either side of said center section;
said center section and said semi-sponsons each defining a running surface for said hull form; and
wherein said semi-sponsons provide buoyancy and hydrodynamic lift for said hull-form.

2. The vessel hull form of claim 1, wherein said center section and each of said semi-sponsons are delimited by a longitudinal step extending along the entire length of said hull form.

3. The vessel hull form of claim 2, said longitudinal steps are disposed at a constant transverse distance from said center section along the entire length of said hull form.

4. The vessel hull form of claim 2, wherein said longitudinal steps have a height that is at least 5% of the width of said hull form.

5. The vessel hull form of claim 1, wherein the width of each semi-sponson is at least 10% of the width of said hull form.

6. The vessel hull form of claim 1, wherein the maximum width of each semi-sponson is maintained for at least 70% of the entire length of said semi-sponson.

7. The vessel hull form of claim 1, wherein said semi-sponson has a deadrise angle of at most 25 degrees.

* * * * *